United States Patent
Conn

(10) Patent No.: US 9,328,605 B2
(45) Date of Patent: May 3, 2016

(54) METHOD AND APPARATUS FOR DETECTING FLUID FLOW MODULATION TELEMETRY SIGNALS TRANSMITTED FROM AN INSTRUMENT IN A WELLBORE

(75) Inventor: David Conn, Sugar Land, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 381 days.

(21) Appl. No.: 13/704,623

(22) PCT Filed: Jun. 16, 2011

(86) PCT No.: PCT/US2011/040706
§ 371 (c)(1),
(2), (4) Date: Jan. 24, 2013

(87) PCT Pub. No.: WO2011/159900
PCT Pub. Date: Dec. 22, 2011

(65) Prior Publication Data
US 2013/0118249 A1    May 16, 2013

Related U.S. Application Data

(60) Provisional application No. 61/355,382, filed on Jun. 16, 2010.

(51) Int. Cl.
*E21B 47/18* (2012.01)
*E21B 47/10* (2012.01)
*G01V 1/44* (2006.01)

(52) U.S. Cl.
CPC .............. *E21B 47/10* (2013.01); *E21B 47/18* (2013.01); *G01V 1/44* (2013.01)

(58) Field of Classification Search
CPC .......... E21B 47/14; E21B 47/16; E21B 47/18; E21B 47/10; E21B 47/182; E21B 47/185; E21B 47/187; G01V 1/44
USPC ................. 73/152.21, 152.19; 367/81–85
See application file for complete search history.

(56) References Cited

U.S. PATENT DOCUMENTS 2,238,058 A   4/1941   Johnson et al.
3,104,717 A   9/1963   Sandlin et al.
(Continued)

FOREIGN PATENT DOCUMENTS

CA   2119986 A1 *   9/1994
EP   392026 A4    3/1991
(Continued)

OTHER PUBLICATIONS

International Search Report and Written Opinion issued in International App. No. PCT/US2011/040706 mailed Feb. 9, 2012, 8 pages.
(Continued)

*Primary Examiner* — Peter Macchiarolo
*Assistant Examiner* — David L Singer

(57) ABSTRACT

An apparatus for detecting fluid modulation signals transmitted by an instrument in a wellbore includes a motion sensor coupled to a selected position on an exterior of a conduit coupled between a discharge side of a fluid pump and an inlet to a pipe string suspended in the wellbore. The instrument is coupled to the pipe string. A signal detector is in signal communication with the motion sensor.

8 Claims, 1 Drawing Sheet

(56) References Cited

U.S. PATENT DOCUMENTS

| | | | |
|---|---|---|---|
| 3,742,443 A * | 6/1973 | Foster et al. | 367/83 |
| 4,692,911 A * | 9/1987 | Scherbatskoy | 367/83 |
| 4,718,048 A * | 1/1988 | Staron et al. | 367/40 |
| 4,963,301 A | 10/1990 | Davis et al. | |
| 4,971,152 A | 11/1990 | Koster et al. | |
| 4,992,997 A * | 2/1991 | Bseisu | 367/82 |
| 5,001,961 A | 3/1991 | Spain | |
| 5,337,823 A | 8/1994 | Nobileau | |
| 5,549,947 A | 8/1996 | Quigley et al. | |
| 5,573,039 A | 11/1996 | Mang | |
| 5,955,966 A | 9/1999 | Jeffryes et al. | |
| 6,324,904 B1 | 12/2001 | Ishikawa et al. | |
| 6,370,082 B1 * | 4/2002 | Gardner et al. | 367/82 |
| 6,618,674 B2 * | 9/2003 | Ireland | |
| 6,741,185 B2 * | 5/2004 | Shi et al. | 340/853.2 |
| 6,898,150 B2 | 5/2005 | Hahn et al. | |
| 7,817,061 B2 * | 10/2010 | Camwell | |
| 8,004,421 B2 * | 8/2011 | Clark | 340/854.4 |
| 8,339,277 B2 * | 12/2012 | Spross | |
| 2005/0071120 A1 | 3/2005 | Hutchinson | |
| 2007/0272442 A1 | 11/2007 | Pastusek et al. | |
| 2008/0137474 A1 * | 6/2008 | Dashevskiy | |

FOREIGN PATENT DOCUMENTS

| | | | |
|---|---|---|---|
| WO | 9118180 A1 | 11/1991 | |
| WO | WO 2008127230 A2 * | 10/2008 | E21B 47/18 |

OTHER PUBLICATIONS

International Search Report issued in related International App. No. PCT/FR94/00484 mailed Sep. 20, 1994, 6 pages.

* cited by examiner

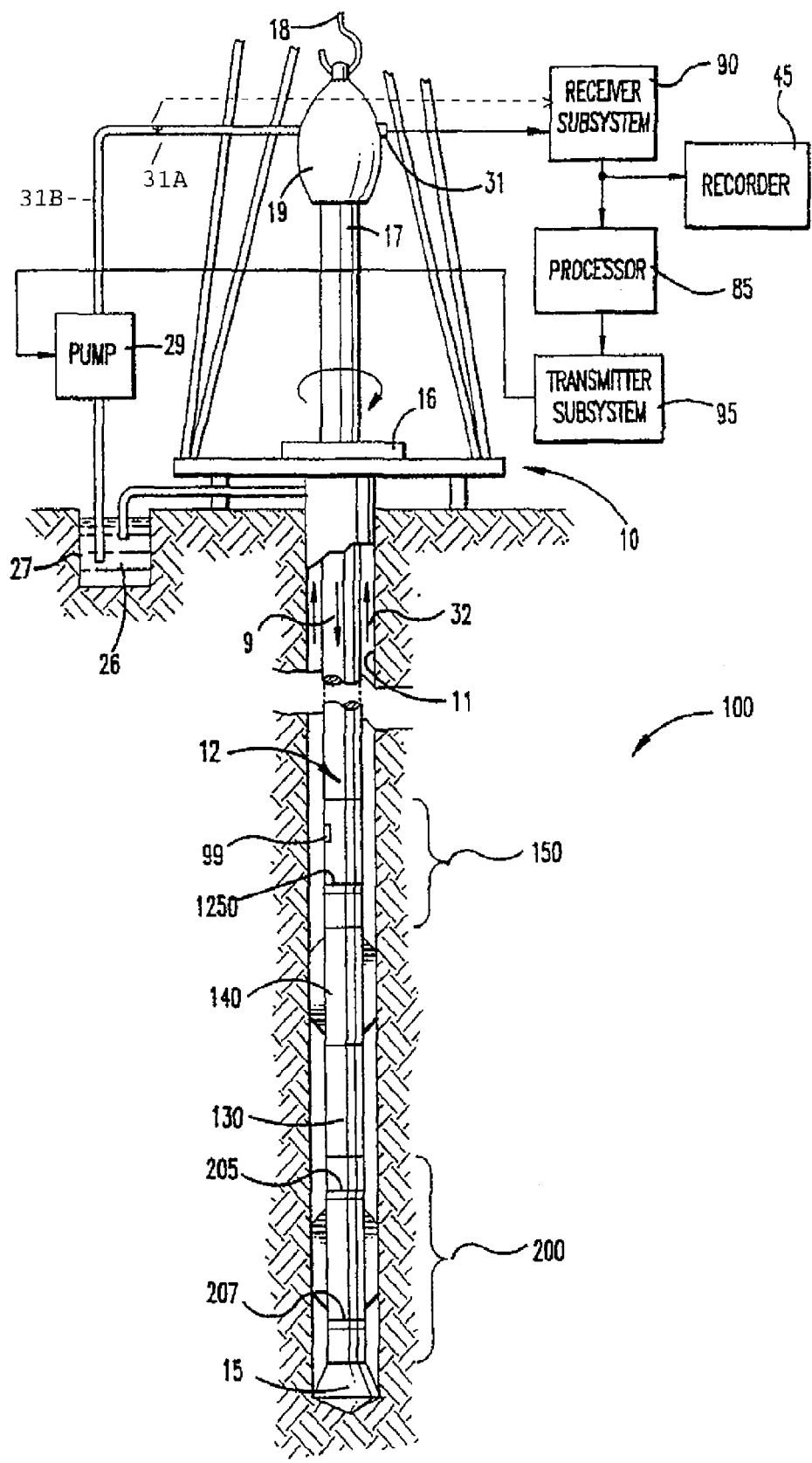

METHOD AND APPARATUS FOR DETECTING FLUID FLOW MODULATION TELEMETRY SIGNALS TRANSMITTED FROM AN INSTRUMENT IN A WELLBORE

FIELD OF THE INVENTION

The invention relates generally to the field of measurement-while-drilling ("MWD") fluid flow modulation telemetry. More specifically, the invention relates to signal detectors for MWD telemetry having improved signal-to-noise ratio.

BACKGROUND INFORMATION

Wellbore measuring instruments, known as measurement-while-drilling and logging-while-drilling instruments, are used in connection with drilling a wellbore through a geotechnical or multiple geotechnical formations. Such wellbore measuring instruments are coupled to a pipe that is used to move a drill bit through the formation to lengthen (drill) the wellbore. These instruments include sensors that measure parameters related to a wellbore trajectory, for example, and/or properties of the formations outside the wellbore. Instruments may typically include a communication device that converts selected measurements made by the sensors into signals that are transmitted to the surface by modulating the flow of drilling fluid in the pipe. The drilling fluid is used for, among other purposes, to cool and lubricate the drill bit and to lift drill cuttings to the surface. The drilling fluid is pumped under pressure from the surface through an interior opening in the pipe string. Communication systems modulate the flow of the fluid so that a signal is detectable at the surface which corresponds to the signal transmitted by the instrument in the wellbore. Typically, the signal is detected using one or more pressure transducers in hydraulic communication with the interior of the fluid system on the discharge side of the pump or the entry point therefrom to the interior of the drill string. A representative example of a mud flow modulation telemetry system and signal detection devices associated therewith are shown in U.S. Pat. No. 5,955,966 issued to Jeffryes et al. and assigned to the assignee of the present disclosure.

There is a need for improved techniques to detect fluid flow modulation telemetry signals from instruments in a wellbore.

SUMMARY

An apparatus, according to one disclosed aspect for detecting fluid flow modulation signals transmitted by an instrument in a wellbore includes a motion sensor coupled to a selected position on an exterior of a conduit coupled between a discharge side of a fluid pump and an inlet to a pipe string suspended in the wellbore. The instrument is coupled to the pipe string and a signal detector is in signal communication with the motion sensor.

A method for detecting fluid flow modulation signals transmitted by an instrument in a wellbore according to another aspect includes detecting motion of a conduit coupled between a discharge side of a fluid pump and an inlet to a fluid passage in a pipe string suspended in the wellbore. The instrument is coupled to the pipe string. The detected motion signals are converted into representations of the fluid modulation signals.

Other aspects and advantages will be apparent from the following description and the appended claims.

BRIEF DESCRIPTION OF THE DRAWINGS

FIG. 1 shows a wellbore drilling system including MWD and/or LWD instruments and a telemetry receiver according to one aspect of the disclosure.

DETAILED DESCRIPTION

FIG. 1 shows an example wellbore measurement instrument. As used herein, "wellbore measurement instrument" is defined as any instrument configured to move along the interior of a wellbore and make measurements of at least one parameter related to the wellbore, the geotechnical formation or formations surrounding the wellbore or the dynamics of a conveyance device used to move the instrument along the wellbore. The wellbore measurement instrument may include, for example, a telemetry transmitter (explained further below) that modulates flow of fluid through a pipe string to transmit selected signals from the instrument to be detected at the Earth's surface.

The example manner of instrument conveyance shown in FIG. 1 is known as measurement-while-drilling, also called measuring-while-drilling or logging-while-drilling and is intended to include the taking of measurements in a wellbore near the end of a jointed pipe assembly called a "drill string." Such pipe assembly typically includes a drill bit at the lower end thereof and at least some of the drill string (the jointed pipe assembly) being disposed in the wellbore during drilling, pausing, and/or tripping. It is to be clearly understood that the example embodiment shown in FIG. 1 is intended to only serve as an example of wellbore measurement instrument(s) and modes of instrument conveyance that may be used in accordance with the invention. Other modes of instrument conveyance include, without limitation, by any other form of segmented (jointed) pipe or coiled tubing, provided that a fluid flow channel exists for the flow modulation telemetry imparted by the instrument. Accordingly, the invention is not limited to use with while-drilling conveyance as shown in FIG. 1.

In the example of FIG. 1, a platform and derrick 10 are positioned over a wellbore 11 that is formed in subsurface formation(s) by rotary drilling. A segmented pipe string ("drill string") 12 is suspended within the wellbore 11 and includes a drill bit 15 at its lower end. The drill string 12 and the drill bit 15 attached thereto are rotated by a rotating table 16 (energized by arrangements not shown) which engages a kelly 17 at the upper end of the drill string 12. The drill string 12 is suspended from a hook 18 attached to a travelling block (not shown). The kelly 17 is connected to the hook 18 through a rotary swivel 19 which permits rotation of the drill string 12 relative to the hook 18. Alternatively, the drill string 12 and drill bit 15 may be suspended from and rotated from the surface by a "top drive" (not shown) type of drilling rig. Drilling fluid or "mud" 26 is contained in a tank or pit 27. A pump 29 pumps the drilling fluid 26 into the drill string 12 via a port in the rotary swivel 19 to flow downward (arrow 9) through the center of drill string 12. The drilling fluid 26 exits the drill string 12 via courses or nozzles (not shown) in the drill bit 15 and then circulates upward in the annular space between the outside of the drill string 12 and the wall of the wellbore 11, commonly referred to as the "annulus", as indicated by the flow arrows 32. The drilling fluid 26 lubricates and cools the drill bit 15 and carries formation cuttings to the surface. The drilling fluid 26 is returned to the pit 27 for recirculation. An optional directional drilling assembly (not shown) with a mud motor having a bent housing or an offset sub may be used. In other non-limiting embodiments, a "straight housing" mud driven motor may be used to turn the drill bit 15 either alone or in combination with rotational energy supplied from the surface (kelly 17 or top drive [not shown]).

Mounted within the drill string 12, for example near the drill bit 15, is a bottom hole assembly, generally referred to by reference numeral 100, which includes capabilities for measuring, processing, and storing information, and communicating with a recording unit 45 at the Earth's surface. As used herein, "near" the drill bit 15 generally means within several drill collar lengths from the drill bit 15. The bottom hole assembly 100 may include a measuring and local communications apparatus 200 described further below. The local communications apparatus 200 may accept as input signals from one or more sensors 205, 207 which may measure any one or more "wellbore parameters" as described above.

In the example of the illustrated bottom hole assembly 100, a drill collar 130 and a stabilizer collar 140 are shown successively above the local communications apparatus 200. The drill collar 130 may be, for example, a "pony" (shorter than the standard 30 foot length) collar or a collar housing for a measuring apparatus which performs measurement functions. The need for or desirability of a stabilizer collar 140 will depend on drilling parameters. Located above stabilizer collar 140 is a surface/local communications subassembly 150. The communications subassembly 150 in the present example may include a toroidal antenna 1250 used for local communication with the local communications apparatus 200, and an acoustic communication system that communicates with a similar system at the Earth's surface via signals carried in the drilling fluid or mud 26.

The to-surface communication system in subassembly 150 includes, for example, an acoustic transmitter which generates an acoustic signal in the drilling fluid 26 that is typically representative of one or more measured downhole parameters. Which parameters and how frequently the associated values are included in the acoustic signal are a matter of choice for the system designer and/or system user and are not a limit on the scope of the present disclosure. One suitable type of acoustic transmitter employs a device known as a "mud siren" which includes a slotted stator and a slotted rotor that rotates and repeatedly interrupts the flow of drilling fluid 26 to establish a desired acoustic wave signal in the drilling fluid 26. Electronics (not shown separately) in the communications subassembly 150 may include a suitable modulator, such as a phase shift keying (PSK) modulator, which produces driving signals for application to the mud siren. These driving signals can be used to apply appropriate modulation to the mud siren. The generated acoustic signal travels upward in the fluid through the center of the drill string 12 at approximately the speed of sound in the drilling fluid 26. The acoustic signal is received at the surface of the Earth by transducers represented by reference numeral 31. The transducers 31, which are, for example, piezoelectric transducers, convert the received acoustic signals to electronic signals. The output of the transducers 31 is coupled to the surface receiving subsystem 90 which is operative to demodulate the transmitted signals, which can then be coupled to processor 85 and the recording unit 45. A surface transmitting subsystem 95 may also be provided, and may be configured to control interruption of the operation of pump 29 in a manner which is detectable by transducers (represented at 99) in the communication subsystem 150, so two way communication is established between the subassembly 150 and the surface equipment when the wellbore measurement instrument is disposed in the wellbore 11. In such systems, surface to wellbore communication may be provided, e.g., by cycling the pump(s) 29 on and off in a predetermined pattern, and sensing this condition downhole at the transducers 99. The foregoing or other technique of surface-to-downhole communication can be utilized in conjunction with the features disclosed herein. The communication subsystem 150 may also include (not shown separately for clarity of the illustration) acquisition, control and processor electronics comprising a microprocessor system (with associated memory, clock and timing circuitry, and interface circuitry) capable of storing data from one or more sensors, processing the data and storing the processed data (and/or unprocessed sensor data), and coupling any selected portion of the information it contains to the transmitter control and driving electronics for transmission to the surface. A battery (not shown) may provide electrical power for the communications subassembly 150. A downhole generator (not shown) such as a so-called "mud turbine" powered by the drilling fluid 26, can also be used to provide power, for immediate use or battery recharging, during times when the drilling fluid is moving through the drill string 12. It will be understood that alternative acoustic or other techniques can be employed for communication with the surface of the Earth.

The communication subassembly 150 is described using an example of a mud siren as the flow modulator in a flow modulation telemetry transmitter. It should be clearly understood that the present disclosure is not limited to use of a mud siren as a telemetry transmitter. The aspects disclosed may also be used with "positive pulse" fluid flow telemetry, in which a valve is momentarily closed or restricted to increase pressure in the fluid system, and "negative pulse" fluid flow telemetry in which a valve is momentarily opened to connect the interior of the drill string 12 through a selected size orifice to the annular space, so that the pressure inside the drill string 12 drops accordingly.

In the present disclosure, a different type of signal detector may be used at the surface to detect the acoustic signal generated by the transmitter in the communications subassembly 150. The detector is generally shown at 31A and may be a motion sensor, such as a vibration sensor, a velocity sensor or an accelerometer, for example a microelectrical mechanical system (MEMS) accelerometer. The motion sensor 31A may be any type of sensor capable of measuring vibration, motion, acceleration, or shock. The motion sensor 31A may be affixed to a portion of the discharge line from the pump 29 to the swivel 19 (or top drive) known as the standpipe, shown generally at 31B. The motion sensor 31A may be in signal communication with the receiver subsystem 90. The motion sensor 31A may be used with or without the pressure transducer 31 described above. The motion sensor 31A may be affixed to the pipe or hose using adhesive, for example, one or more of the class of adhesives known as cyanoacrylates.

In use of the motion sensor 31A as shown in FIG. 1, detection of the signal generated by the communications subassembly 150 may be improved by affixing the motion sensor 31A to a portion of the mud discharge path that consists of a non-metallic hose, such as a rubber hose. For example, the standpipe is typically a steel conduit, but is typically connected to the kelly or top drive at one end and to the pump at the other end (depending on the drilling rig configuration) using rubber hose. Placement of the motion sensor 31A on such hose may improve signal detection.

The pressure signal from the communication subassembly when it arrives at the surface can be thought of as a standing wave, with several different maxima and minima. Ideally, a sensor for detecting the signals from the instrument in the wellbore may be placed at the location of a maximum. Such selective placement has proven impracticable for the transducer shown at 31 in FIG. 1, however it is relatively simple to move the motion sensor 31A along the standpipe 31B or connected pipe in order to place the motion sensor 31A at the position of such a maximum. This process may be greatly improved by the existence of an hydraulic channel modeling program for predetermining the location of maximum. The position of the motion sensor 31A may also be selected by testing the signal output therefrom at the well site during operation of the drilling system shown in FIG. 1.

Noise signals, e.g., noise from the pump 29 will likewise have maxima and minima. The motion sensor 31A could also be moved to align with the position of a noise minimum. The motion sensor 31A may determine that different pressure sources excite different vibration modes in the standpipe 31B and connected components. As a result, mud pump noise can be filtered out of the motion sensor signal using signal processing techniques. This is not possible when using pressure transducers to detect the signal from the communications subassembly 150. Because a principal cause of signal degradation in mud pulse telemetry is mud pump noise, the ability to filter the pump noise using signal processing is advantageous and highly desirable.

A combination of the foregoing three parameters, i.e., motion sensor placement for maximum standing wave signal, motion sensor placement for minimum pump noise signal, and signal processing to filter the detected pump noise could be used in combination to obtain the maximum signal to noise ratio (SNR).

Any number of the motion sensors 31A may be in signal communication with the receiver subsystem 90 and/or positioned on the standpipe 31B. One or more of the motions sensors 31A may be positioned at different orientations and/or different positions of the standpipe 31B. In one example, the motion sensor 31A may be a triaxial accelerometer. A triaxial accelerometer includes three acceleration sensing devices generally disposed so that the sensitive axis of each acceleration sensing device is in a direction orthogonal to the sensitive axis of the other two devices. In yet another example embodiment, the motion sensor 31A may be a plurality of such triaxial accelerometers disposed circumferentially around the exterior of the standpipe 31B. The receiver subsystem 90 may include programming instructions to combine and/or filter the signals from each channel of the plurality of triaxial accelerometers to obtain a maximum signal to noise ratio of the acoustic signal transmitted by the communications subsystem 150.

Aspects provide for freedom of installation wherein a user may achieve improved signal to noise ratio. In aspects described, pressure signals detected are the subject of reflections that create maxima and minima at locations along piping. Using accelerometers, which may be mounted in various locations, signal-to-noise ratio may be operationally improved. Such accelerometers may be moved, by operators, as necessary.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for transmitting downhole measurements to a surface location, the method comprising:
    deploying a mud pulse telemetry transmitter in a drill string in a subterranean wellbore;
    causing the mud pulse telemetry transmitter to modulate a flow of drilling fluid in the drill string, said modulated flow generating an acoustic signal in the drilling fluid, the acoustic signal representative of the downhole measurements;
    deploying an accelerometer on an exterior surface of a conduit providing fluid communication between a discharge side of a drilling fluid pump and an inlet to the drill string;
    using the accelerometer to receive the acoustic signal in the drilling fluid; and
    converting said received acoustic signal in the drilling fluid into representations of the downhole measurements;
    wherein the accelerometer is deployed at a position corresponding to a maximum amplitude of a standing wave generated in the conduit by the mud pulse telemetry transmitter and a minimum amplitude of a noise signal generated in the conduit by a drilling fluid pump.

2. The method of claim 1, wherein the accelerometer comprises a plurality of triaxial accelerometers deployed about a circumference of the conduit; and
    using the accelerometer comprises using each of the plurality of triaxial accelerometers to receive the acoustic signal in the drilling fluid.

3. The method of claim 2, further comprising combining measurements from each of the plurality of triaxial accelerometers along three mutually orthogonal directions and at a plurality of circumferential positions to maximize a signal to noise ratio of the received acoustic signal in the drilling fluid.

4. The method of claim 1, wherein the conduit comprises a rubber hose providing fluid communication between a standpipe and the inlet to the pipe string.

5. The method of claim 1, wherein the conduit comprises a rubber hose providing fluid communication between the discharge side of a fluid pump and a standpipe.

6. The method of claim 1, wherein:
    the accelerometer comprises a plurality of triaxial accelerometers deployed along an axis of the conduit; and
    using the accelerometer comprises using each of the triaxial accelerometers to receive the acoustic signal in the drilling fluid;
    wherein at least one of the plurality of triaxial accelerometers is deployed at the position.

7. The method of claim 1 wherein the accelerometer comprises a microelectrical mechanical system accelerometer.

8. The method of claim 1, wherein the conduit comprises a steel standpipe.

* * * * *